United States Patent Office 3,188,298
Patented June 8, 1965

3,188,298
STABILIZER COMBINATIONS OF ORGANIC PHOSPHITES WITH HYDROXY SUBSTITUTED BENZOPHENONES OR SALICYLIC ACID ESTERS FOR POLYOLEFIN COMPOSITIONS
George R. Williamson, Davyhulme, near Manchester, and Bernard Wright, Eccles, near Manchester, England, assignors to Shell Oil Company, New York, N.Y., a corporation of Delaware
No Drawing. Filed Feb. 12, 1962, Ser. No. 172,784
Claims priority, application Great Britain, Feb. 15, 1961, 5,620/61
10 Claims. (Cl. 260—45.85)

This invention relates to stabilized polymers. More particularly, it relates to the stabilization of low pressure polymers of alpha-monoolefins, such as Ziegler type polyethylene, against deterioration resulting from exposure to actinic light; stabilization is accomplished with a novel synergistic combination of stabilizers.

Polyolefins such as polyethylene and polypropylene and the like, in common with most synthetic polymers, may undergo degradation and discoloration in use. This may occur as a result of exposure to light, or as a result of processing, e.g., milling or other working at elevated temperatures, i.e., temperatures above 100° C. The photo-degradation of such polymers is an oxidative process in which polymer chains break down due to attack by by oxygen under the influence of light, resulting in utimate loss of tensile strength of the polymer. Ultra-violet radiation is particularly damaging. A number of compounds are known as additives for inhibiting oxidation or photo-degradation of many polymers which have been heretofore commercially used. Many of these additives are not desirable for use with low pressure poly-alpha olefins, for various reasons; for example, they may result in undesirable side effects, such as substantial decoloration of the polymer, even while they serve to inhibit oxidation.

Much effort has been devoted to the problem of finding satisfactory stabilizers to protect polyolefins from the effects of actinic radiation. A number of inhibitors and inhibitor types have been studied, none of which appear to be completely satisfactory.

Some synergistic systems of inhibitors have been suggested. Apart from the fact that it is an unexpected technological discovery when two stabilizers are found that will synergize with each other in protecting polymer compositions, there are usually practical advantages in the use of combinations of stabilizers as distinguished from the use of a single stabilizer material. For example, one of the stabilizers of a combination might be costly while the other might be relatively cheap and readily available. In such a situation it is advantageous to be able to substitute the cheaper, more available stabilizer for a portion of the more expensive stabilizer while still obtaining good stabilization through the synergism of the stabilizer combination. Furthermore, one of the stabilizers of a synergistic combination which protects against deterioration from actinic light might also serve as an effective stabilizer against discoloration or other degradation due to high temperature processing methods or to the use of the polymer composition at relatively high temperatures. Thus, it is highly desirable in the polyolefin art to have available synergistic combinations of two or more stabilizers.

It is an object of this invention to provide new synergistic combinations of stabilizers for polymers of alpha-olefins.

It is another object of the invention to provide novel compositions of polymers of alpha-monoolefins, and particularly to provide novel stabilized combination of polymers of alpha-monoolefins.

It is a particular object to provide novel polyethylene compositions containing a synergistic combination of compounds providing improved stability of the polyethylene compositions against deterioration resulting from exposure to sunlight or ultraviolet light. Another object is to provide similarly protected polypropylene compositions and other compositions of polymers of alpha-monoolefins.

Other objects of the invention will appear from the following description thereof.

This invention comprises polymer compositions consisting predominantly of polymers of alpha-monoolefins having incorporated therein a synergistic stabilizer combination comprising: (1) an organic compound having a general formula

(I)

in which Z represents a hydrogen atom or an —OR' radical, and R and R' represent the same or different hydrocarbon radicals which are selected from the group consisting of substituted and unsubstituted alkyl, cycloalkyl, aryl, alkaryl and aralkyl radicals; and (2) a derivative of benzophene or salicylic represented by the general formula

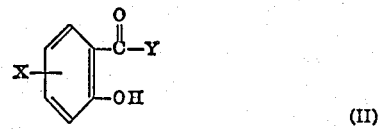

(II)

in which X represents a hydrogen atom, a halogen atom or a radical selected from substituted and unsubstituted alkyl, cycloalkyl, aryl, alkoxy, aryloxy, acyl or aroyl radicals; and Y represents a substituted or unsubstituted aryl radicial or a radical —OR" in which R" represents a substituted or unsubstituted alkyl or aryl radical.

While compounds of the general type of each of these ingredients of the stabilizing combination have been known and may have been applied in the stabilization of low pressure polyolefins, it has now been found that combinations of compounds of the two different types provide substantial synergistic improvements in the protection of polyolefins against the effects of actinic radiation. Combinations of certain preferred compounds of the two types provide particularly outstanding and unusually useful protection of low pressure polyethylene against deterioration due to ultraviolet radiation.

In a particularly preferred modification of this invention, polyolefins are stabilized with a combination of stabilizers containing not only the above described synergistic combination but further containing at least a third component which is either (1) a metal salt of an organic acid in which the metal is selected from Groups 1 to 4 of the Mendeleeff Periodic Table and the acid is preferably a long chain fatty acid or (2) a sulfide or selenide of a metal from Group 2 of the periodic table. As used herein the term "periodic table" or reference thereto has reference to the Mendeleeff Periodic Table. It is sometimes of advantage to add both of these additional components. The metal salts of organic acids assist in reducing the corrosivity of the polyolefin compositions to molds and other surfaces with which the hot polymer comes into contact. It has furthermore been found that they have the surprising result of increasing the tensile strength of Ziegler polyethylene. The addition of a Group 2 metal sulfide or selenide has been found to promote the effectiveness of the synergistic combination of organic phosphite and benzophenone type or salicylic acid type stabilizer.

The organic phosphites which are suitable for use in accordance with this invention includes those described in U.K. patent specification 803,557. Typical of these compounds are trihexylphosphite, tricyclohexylphosphite, tri(2-ethylhexyl)phosphite, trioctylphosphite, tri(n-octyl)phosphite, tri(n-nonyl)phosphite, trilaurylphosphite, tristearylphosphite, tri(p-isopropylphenyl)phosphite, tri(p-tertiary butylphenyl)phosphite, di(p-tertiary butylphenyl)monophenylphosphite, and tri(nonylphenyl)phosphite. Also suitable are phosphites corresponding to the above in which one of the hydrocarbon groups is replaced by a hydrogen atom, as for example, dihexylhydrogenphosphite, dioctylhydrogenphosphite, dilaurylhydrogenphosphite, di(p-tertiary butylphenyl)hydrogenphosphite and the like.

Preferred for use in this invention are the trialkylphosphites and the trialkyl phenyl phosphites in which the alkyl groups have from 7 to 12 carbon atoms.

The second essential ingredient of the synergistic stabilizer combinations of this invention is characterized by the presence of the

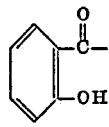
(III)

group. This group is present both in substituted benzophenones and in esters of salicylic acid. Various compounds of both of these types are effective light stabilizers for polyolefins. Compounds containing group III will be sometimes referred to herein as "aromatic stabilizers."

The generic formula for the aromatic stabilizers, given above, is

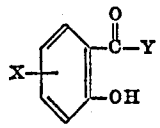
(II)

where the symbols X and Y have the previously stated meaning.

Insofar as Formula II represents effective salicylic acid esters, Y stands for the group —O—R″ and R″ has the previously given meaning. In representing the preferred salicylic acid esters, the symbols of Formula II have the following meaning:

X is R‴, OR‴ or R‴CO
Y is —O—$R^{IV}X'$
R‴ is a substituted or unsubstituted hydrocarbon radical
$R^{IV}$ is preferably an aromatic radical but may also represent an aliphatic radical
X′ represents one or more hydrocarbon or non-hydrocarbon substituent groups on $R^{IV}$, X′ may be, for example, a hydrocarbon radical, an alkoxy radical, a sulfur-containing radical, a hydrogen atom or a halogen atom.
X may be hydrogen when X′ is a hydrocarbon radical-containing substituent.

In particularly preferred inhibitors of the salicylate type, $R^{IV}$ is a phenyl radical, X′ is hydrogen or a hydrocarbon radical, and X is a hydrocarbon radical or, when X′ is or contains a hydrocarbon radical, hydrogen.

Preferably X′ is an aliphatic radical, which may contain non-aliphatic hydrocarbon and/or non-hydrocarbon substituents, e.g., one or more aromatic groups, halogen atoms or sulfur-containing groups.

Particularly preferred are compounds in which $R^{IV}X'$ is an alkyl substituted phenyl radical, X′ being an alkyl radical containing at least two carbon atoms.

In the preferred compounds, X′ may be a branched lower alkyl such as isopropyl or tertiary butyl or a normal alkyl of intermediate carbon number, e.g., from n-octyl through n-tetradecyl.

Preferred stabilizers of the salicylate type are dodecylphenyl salicylate and tertiary butylphenyl salicylate. Completely aromatic salicylates are, for example, 4-biphenyl-5-phenylsalicylate and 4-biphenyl salicylate.

In representing additives of the type of substituted benzophenones, Y in generic Formula II represents an unsubstituted aryl radical, or a substituted aryl radical $R^VX'$, in which $R^V$ is an aryl group. The other symbols have the same significance as set out before, namely, X—hydrogen, halogen, or a radical from the group consisting of substituted or unsubstituted alkyl, cycloalkyl, aryl, alkoxy, aryloxy, acyl and aroyl X′—one or more hydrocarbon or non-hydrocarbon substituent groups, including alkoxy, sulfur-containing radicals and halogen.

Among the benzophenone type additives, the preferred group are those in which Y represents a phenyl radical which is either unsubstituted or which contains hydroxyl and/or alkoxy substituents, (i.e., X′ is a hydroxy or alkoxy group) and X represents one hydroxy or alkoxy substituent. A number of compounds of this type are commercially available stabilizers. Typical are 2,2′-dihydroxy-4-methoxybenzophenone and 2,2′-dihydroxy-4-n-octoxybenzophenone which are particularly preferred and furthermore 2-hydroxy-4-methoxybenzophenone, 2,2′-dihydroxy-4,4′-dimethoxy-benzophenone, 2,2′,4,4′-tetrahydroxybenzophenone, 2,4-dihydroxybenzophenone, 2-hydroxy-4,4′-dimethoxybenzophenone, 2,2′-dihydroxy-4-methoxybenzophenone, 2,2′-dihydroxy-5-n-butoxybenzophenone, 2,2′-dihydroxy-5-n-dodecyloxybenzophenone, 2,2′-dihydroxy-5-n-octoxybenzophenone, 2-hydroxy-5-dodecyloxybenzophenone, and 2-hydroxy-4-n-octoxybenzophenone.

In general, among the 2-hydroxy-4-alkoxybenzophenones those are preferred in which the alkyl group has from 12 to 14 carbon carbon atoms. Among the 2-hydroxy-5-alkoxybenzophenones those are preferred in which the alkyl group has 8 carbon atoms, including normal and branched alkyl groups. Among the 2-hydroxy-4,4′-dialkoxybenzophenone those are preferred in which the alkyl groups have from 1 to 8 carbon atoms and preferably from 1 to 4.

Summarizing the generic aspect of the aromatic inhibitors used in this invention, they can be represented by Formula II

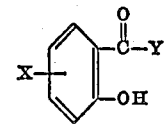

in which

X represents a hydrogen atom, a halogen atom or a radical selected from substituted and unsubstituted alkyl, cycloalkyl, aryl, alkoxy, aryloxy, acyl or aroyl radicals
Y represents a substituted or unsubstituted aryl radical $R^VX'$, or the radical —OR″
R″ represents a substituted or unsubstituted alkyl or aryl radical $R^{IV}X'$
$R^{IV}$ represents an alkyl or aryl radical carrying one or more substituents X′
$R^V$ represents an aryl radical carrying one or more substituent X′
X′ represents one or more hydrocarbon or non-hydrocarbon substituent groups, for example, hydrogen, alkyl, cycloalkyl, aryl, alkoxy, sulfur-containing groups, and halogen.

As metal salts of organic acids which may be used as third components of the synergistic additive combination of this invention, it is preferred to use salts of long chain fatty acids and metals of Groups 1 to 4 of the periodic table. Particularly suitable are, for example, the stearates, oleates and ricinoleates of lithium, calcium, strontium, barium, magnesium, zinc, cadmium, aluminum, tin, lead and bismuth. Of these, the calcium, lithium, barium, cadmium, and lead salts are preferred, the calcium salts being particularly preferred. One of the special advantages of the calcium salts is that they are non-toxic. Calcium stearate in particular is applicable for general use in Ziegler polyethylene and polypropylene together with the stabilizer combination of the present invention. Suitable salts are those of fatty acids having at least 6, preferably at least 8 or 10 and generally up to 30 carbon atoms per molecule. Salts of other carboxylic acids such as phthalic acid, 2-ethylhexoic acid, alkyl salicylic acids, naphthenic acids, aliphatic acids available singly or as mixtures in the form of Koch acids and oxo acids, and other long chain saturated aliphatic acids, e.g., lauric acid, may also be used. While it is preferred to use a simple salt of the kind exemplified by calcium stearate or lead 2-ethylhexoate, it is also possible to use complex metal salts, e.g., the various organo lead salts, e.g., tributyl lead ricinoleate and organo tin salts, e.g., dibutyl tin dilaurate, such as have been proposed for use as stabilizing additives for polyvinyl chloride. Lithium hydroxy stearate may be used in lieu of lithium stearate. One may also use the "basic salts" of the kind referred to in U.K. Patent 844,437, including the "highly basic calcium and barium naphthenates" of Examples 9 and 10 of U.K. Patent 786,167.

It is believed that the presence of metal carboxylic acid salts has a promoting effect on the advantageous mutual influence of the aromatic type and phosphite components of the stabilizing composition, as well as acting to prevent the development of corrosive tendencies of Ziegler polyolefins. The advantageous effect of the metal salt additive, particularly Group 2 metal long chain fatty acid salts, which can give rise to an improvement in physical properties of a Zeigler polyethylene is an unexpected advantage of the present invention and represents a technical advance in the Zeigler polyolefin art. Thus, while it is known that a carboxylic acid salt such as for example calcium stearate can impart useful lubricating properties to a polymeric material, it has been found that when it is used in a Zeigler polyolefin in conjunction with the herein defined aromatic stabilizers and organic phosphite there is not only a manifestation of useful lubricating and mold release properties but also in many instances an improvement in tensile strength of linear polyolefins, particularly of polyethylene.

The addition of a Group 2 metal sulfide or selenide, e.g. calcium sulfide, barium sulfide, zinc sulfide, cadmium sulfide or the corresponding selenides, has been found to promote the effectiveness of the synergistic combination of organic phosphite and aromatic stabilizer.

If desired the compositions of the present invention can also contain one or more pigments, e.g., titanium dioxide or zinc oxide; and also other additives required for special purposes, e.g., anti-static agents.

The inhibitor combinations of this invention can be used to stabilize a variety of polymer compositions against deterioration resulting from exposure to actinic light. In general, the stabilizable compositions comprise a major proportion of a polyolefin prepared by the so-called low pressure polymerization process, i.e. a process operating at pressures below about 500 atmospheres, using a stereospecific catalyst system. A variety of stereospecific catalysts have been described in the literature. They are generally species or modifications of the so-called Zeigler or Natta catalysts. The resulting polymers are essentially linear in structure. Zeigler polymerization processes are described in U.K. patent specification Nos. 799,392, 799,823, 801,031, and 810,023.

In the production of linear polymers, the reaction mixture formed in the low pressure polymerization is treated to deactivate the catalyst, usually by contact with a polar compound such as an alcohol and/or hydrochloric acid, and is subsequently worked for removal of at least a substantial part of the catalyst residue. The resulting polymer almost invariably contains at least traces of catalyst residue. Typically, it may contain 50 to 500 parts per million (p.p.m.) of each of the catalyst components, calculated as the corresponding metal. A carefully purified polymer may contain as little as 10 p.p.m. of each metal or less. The additives of this invention are effective in polymers containing catalyst residues.

The Zeigler type catalyst may be designated "metal alkyl-reducible metal halide type" and the Natta type catalysts "preformed metal subhalide type." This terminology is used, for example, in "Polyolefin Resin Processes," by Marshall Sittig, Gulf Publishing Co., Houston, Texas, 1961. These well known catalysts are the reaction products of halides, in order of preference, chlorides and bromides, of transition metals from subgroups (b) of Groups 4 and 5 of the Mendeleeff Periodic Table, as illustrated on page 28 of Ephraim, "Inorganic Chemistry," sixth English edition, i.e., Ti, Zr, Hf, Tl, V, Nb or Ta, with organometallic reducing agents in which the metal is from Groups 1, 2 or 3. Preferred reducing agents are organoaluminum compounds and particularly aluminum alkyls, including aluminum alkyl halides. Among the effective catalysts are those prepared, for example, (a) by mixing an aluminum trialkyl, e.g., aluminum triethyl or triisobutyl or an aluminum alkyl halide, e.g., aluminum diethyl monochloride, with a Group IVA metal halide, in particular a chloride, e.g., titanium tetrachloride or trichloride; or (b) by mixing an aluminum trialkyl, e.g., aluminum triethyl, with titanium tetrachloride in substantially stoichiometric amounts (which term includes a slight excess, e.g., up to 20% wt. of the aluminum trialkyl) and, after reduction of $TiCl_3$ has taken place, adding an aluminum dialkyl chloride, e.g., aluminum diethyl chloride thereto. While the present invention is particularly suitable for the inhibition of linear polyethylene it can also be used in the inhibition of other polymers of alpha-olefins, particularly those having from 3 to 10 carbon atoms, including both straight chain and branched terminally unsaturated alkenes, and also including copolymers of such olefins, e.g., copolymers of ethylene with propylene or with 1-butene. Other hydrocarbon polymers may also be stabilized according to this invention, e.g., high pressure polyethylene, and polystyrene.

The phosphite and aromatic type additives of this invention are generally each employed in amounts from 0.001 up to about 5% by weight, i.e., in a total amount between 0.002 and 10% by weight, based on the amount of polyolefin. The amount of each inhibitor type is preferably between about 0.1 and 1%. Amounts of about 0.25 to about 0.35% of each type of additive are typical. Mixtures of one or more of said organic phosphites, e.g., alkyl or alkylaryl phosphites, together with one or more of said aromatic stabilizers may be present in the polymers. The fatty acid salts of Groups 1 to 4 metals are also suitably employed in concentrations between 0.001 and 5% and generally between 0.05 and 5%. Sulfides or selenides of Group 2 metals are suitably used in amounts between 0.1 and 1%, and preferably between 0.25 and 0.75%.

The weight ratios of the phosphite and aromatic type stabilizers are suitably approximately 1:1, but they may vary in the range from 1:20 to 20:1, preferably from 1:10 to 10:1, and more preferably from 1:5 to 5:1.

Any suitable method may be employed for incorporating the additive combination of this invention into olefin polymers. Several such methods are well known. In a particularly suitable method, which is included as part of this invention, a polymer composition comprising a major proportion of a polyolefin, such as obtained by polymerizing an alpha-monoolefin by the Zeigler low pressure process and a minor proportion of additive comprising an organic phosphite as defined above and an aromatic stabilizer as defined above, is prepared by dry blending said additives with said polymer, for example in a powder blender, and thereafter mechanically working the resulting dry blend at an elevated temperature, as for example by milling at a temperature above about 100° or by extrusion or by mixing in a Banbury mixer, e.g., at 150–170° C.

Particularly preferred additive combinations for use in carrying out the present invention are the trialkyl phosphites such as trilauryl or trioctyl phosphite or certain of the aryl phosphites, for example, the material sold under the trade name "Polygard," which is tri(nonylphenyl)phosphite, i.e., an alkylated aryl phosphite of the type defined above, when used in conjunction with an alkyl-phenyl salicylate, for example, tertiary butyl phenyl salicylate or a hydroxy-alkoxy benzophenone or a dihydroxy-alkoxy benzophenone.

The polymer compositions of the present invention can be used generally for the fabrication of plastic material or articles, e.g., by injection molding or melt extrusion; polyolefin compositions in accordance with the present invention are particularly suitable for making films and filaments.

The U.V. stabilizing effectiveness of a particular additive can be determined by exposing a sample of standard dimensions of the polymer containing the additive (conveniently a strip 0.5 cms. wide, 10 cms. long and 0.060 cms. thick) to ultraviolet radiation for a sufficiently long period that breakage occurs on the first flexing. In carrying out this determination a standard sample before exposure is flexed until breakage occurs and the number of flexes required is noted. Another sample is exposed for a number of hours and then flexed to breakage and the number of flexes required is again noted. This procedure is repeated for other samples with increasing exposure periods and from the results the number of flexes is plotted against the number of hours to give a graph from which the exposure period in hours required to degrade the polymer to such an extent that breakage occurs on the first flexing can be determined.

Any suitable radiation can be employed. The figures quoted in the following examples were mostly obtained by exposure to natural sunlight at Curacao. In some cases it is convenient to express the U.V. stability of a polymer as a percentage determined by dividing the number of flexes required for breakage after T hours' exposure by the number of flexes required for breaking the unexposed polymer: such a figure is referred to as percent flex. in certain of the following examples.

The present invention is illustrated by the following examples. The abbreviation "phr." has its ordinary significance in the art, namely "parts per hundred resins" (i.e., parts of additive per hundred parts of polymer). All parts and percentages are by weight unless otherwise stated. These examples are illustrative of preferred embodiments and are not to be considered a limitation of this invention.

EXAMPLE 1

A Ziegler polyethylene is milled with various amounts of both an organic phosphite and an aromatic stabilizer at 160° C. to form a homogeneous blend in each case. The resulting compositions are pressed into sheets and tested for flex life in the manner described above. For comparative purposes the same polyethylene is tested without any additives and also with various amounts of the organic phosphite and the aromatic stabilizer added singly. The results obtained using TNPP [tri(nonylphenyl)phosphite] as the organic phosphite and either (a) U.V. 24 [2,2'-dihydroxy-4-methoxybenzophenone] or (b) U.V. 314 [2,2'-dihydroxy-4-n-octoxybenzophenone] or (c) TBS [4-tertiary butylphenylsalicylate] or (d) DS [dodecylphenylsalicylate] as the U.V. stabilizer are indicated in Table 1.

Table 1

| Phosphite Additive | Aromatic Additive | Flex Properties | |
|---|---|---|---|
| | | Flex life, (hr.) | Percent Flex |
| None | None | 450 | |
| 0.3 phr. TNPP | None | 625 | |
| None | 0.3 phr. U.V. 24 | 740 | |
| 0.3 phr. TNPP | 0.3 phr. U.V. 24 | 1,220 | |
| None | 0.3 phr. U.V. 314 | 1,100 | |
| 0.3 phr. TNPP | 0.3 phr. U.V. 314 | >2,400 | 48.5 |
| None | 0.3 phr. TBS | 800 | |
| 0.3 phr. TNPP | 0.3 phr. TBS | >2,000 | |
| None | 0.3 phr. DS | 1,400 | |
| 0.3 phr. TNPP | 0.3 phr. DS | >2,400 | 44 |

EXAMPLE 2

The procedure outlined in Example 1 is repeated, using trilauryl phosphite (TLP) as the organic phosphite. The results shown in Table 2 are obtained with the various aromatic additives referred to in Example 1:

Table 2

| Phosphite Additive | Aromatic Additive | Flex Properties | |
|---|---|---|---|
| | | Flex life, (hr.) | Percent Flex |
| 0.3 phr. TLP | None | 400 | |
| 0.3 phr. TLP | 0.3 phr. U.V. 24 | 1,200 | |
| 0.3 phr. TLP | 0.3 phr. U.V. 314 | >2,400 | 28 |
| 0.3 phr. TLP | 0.3 phr. TBS | 1,600 | |
| 0.3 phr. TLP | 0.3 phr. DS | >2,400 | 12 |

EXAMPLE 3

The synergism between additives of this invention is particularly apparent from the following results (Table 3), in which the flex life for Ziegler polyethylene containing 0.3 phr. of aromatic additive and 0.3 phr. of organic phosphite is compared with polyethylene containing 1.0 phr. of the aromatic additive but no phosphite. As will be appreciated it is of great advantage to be able to achieve equal or superior results using a lesser amount of total additive.

Table 3

Additive: Flex life, hrs.
  1 phr. U.V. 24 _____ 1200
  0.3 phr. U.V. 24 }
  0.3 phr. TNPP }------------------------- 1200
  1 phr. TBS _____ 1950
  0.3 phr. TBS }
  0.3 phr. TNPP }------------------------- >2000

EXAMPLE 4

Some further figures, in Table 4, provide a comparison between (a) 0.6 phr. of two aromatic additives, namely, U.V. 24 and TBS, in Ziegler polyethylene and (b) the same total amount of additive in accordance with the present invention, namely 0.3 phr. of TNPP or TLP and 0.3 phr. of U.V. 24 or TBS and (c) 0.6 phr. of two phosphites, namely, TLP and TNPP:

Table 4

Additive: Flex life, hrs.
  0.6 phr. U.V. 24 _____ 960
  0.3 phr. U.V. 24 }
  0.3 phr. TNPP }------------------------- 1,220
  0.3 phr. U.V. 24 }
  0.3 phr. TLP }-------------------------- 1,200
  0.6 phr. TBS _____ 1,200
  0.3 phr. TBS }
  0.3 phr. TNPP }------------------------- >2,000
  0.3 phr. TBS }
  0.3 phr. TLP }-------------------------- >1,600
  0.6 phr. TNPP _____ 900
  0.6 phr. TLP _____ 480

While TLP and TNPP have been singled out for special mention and exemplification as suitable organic phosphites since these phosphites have the advantage of ready availability, other phosphites are also suitable as indicated above, particularly the relatively longer chain (e.g., $C_7$ to $C_{12}$) tri-alkyl phosphites and the corresponding tri-alkylphenyl phosphites. Other phosphites have also been tested as synergistic additives to the "salicylate" and "benzophenone" type of U.V. stabilizers, e.g. dilauryl hydrogen phosphite.

Similarly, other benzophenone and salicylate stabilizers, such as those enumerated hereinbefore, are used with similarly satisfactory results in combinations with organic phosphites.

EXAMPLE 5

As previously indicated it is also advantageous for the compositions of the present invention to contain a Group 2 metal sulfide in addition to the organic phosphite and U.V. stabilizer. The present example illustrates this. A Ziegler polyethylene is blended with additives comprising (a) 0.45% tri(nonyl-phenyl)phosphite and 0.45% of tertiary butyl phenyl salicylate and (b) 1.3% of cadmium sulfide and 1.3% of titanium dioxide. The resulting blend is irradiated for 1100 hours in a Kelvin and Hughes enclosed carbon arc fadeometer and then tested by flexing. It is found that the blend has a higher flex life than an unirradiated sample of the same Ziegler polyethylene but without these additives. As compared with a flex life of 100% of the straight polyethylene, the blend, after irradiation, had a flex life of 159%. The improvement obtainable in certain circumstances with the Group 2 metal sulfide is believed to be not dependent upon the presence of a pigment or upon the nature of the pigment when this is used. On the other hand, it has been found that in some circumstances it is desirable to add a pigment, such for example as zinc oxide, to a polyolefin which contains, in accordance with the present invention, a synergistic combination of aromatic additive and organic phosphite. As a specific example there can be mentioned a polyolefin composition comprising Ziegler polyethylene, 0.2 to 0.4% of each of TBS and TNPP, and 1 to 2% of zinc oxide; if desired such a composition can also contain 0.1 to 1% of a Group 2 metal stearate.

We claim as our invention:

1. A polyethylene composition consisting essentially of Ziegler polyethylene containing therein from 0.001% to 10% by weight of a synergistic combination consisting of (a) an organic phosphite having the formula

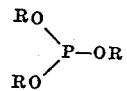

in which R is selected from the group consisting of alkyl and alkaryl radicals, and (b) a U.V. stabilizer having the formula

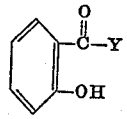

in which Y is a member selected from the group consisting of 4-methoxyphenyl, 2-hydroxy - 4 - alkoxyphenyl wherein the alkoxy is selected from the group consisting of methoxy and octoxy, 2-hydroxyphenyl and 4-alkphenoxy wherein the alkyl group is selected from the group consisting of isopropyl, tertiary butyl and normal alkyls of from 8 to 14 carbon atoms, said components (a) and (b) having a weight ratio in the range of from 1:20 to 20:1.

2. A polyethylene composition consisting essentially of Ziegler polyethylene containing therein from 0.1% to 1% by weight of a synergistic stabilizer combination consisting of tri(nonylphenyl) phosphite and 2,2'-dihydroxy-4-methoxybenzophenone, wherein the weight ratio of said phosphite to said benzophenone is in the range of from 1:20 to 20:1.

3. A polyethylene composition consisting essentially of Ziegler polyethylene containing therein from 0.1% to 1% by weight of a synergistic stabilizer combination consisting of tri(nonylphenyl) phosphite and tertiary butyl phenylsalicylate, wherein the weight ratio of said phosphite to said salicylate is in the range of from 1:20 to 20:1.

4. A polyethylene composition consisting essentially of Ziegler polyethylene containing therein from 0.1% to 1% by weight of a synergistic stabilizer combination consisting of trilauryl phosphite and 2,2'-dihydroxy-4-methoxybenzophenone, wherein the weight ratio of said phosphite to said benzophenone is in the range of from 1:20 to 20:1.

5. A polyethylene composition consisting essentially of Ziegler polyethylene containing therein from 0.1% to 1% by weight of a synergistic stabilizer combination consisting of trilaurylphosphite and tertiary butylphenylsalicylate, wherein the weight ratio of said phosphite to said salicylate is in the range of from 1:20 to 20:1.

6. A polyethylene composition as claimed in claim 1 containing a salt of an organic acid containing from 6 to 30 carbon atoms and a metal from Groups 1 to 4 of the Mendeléeff Periodic Table.

7. A polyethylene composition as claimed in claim 2 containing 0.05% to 0.5% by weight of calcium stearate.

8. A polyethylene composition as claimed in claim 1 containing a metal sulfide from Group 2 of the Mendeléeff Periodic Table.

9. A polyethylene composition as claimed in claim 2 containing a sulfide selected from the group consisting of zinc sulfide and cadmium sulfide in an amount between 0.25 and 0.75% by weight.

10. A polyethylene composition as claimed in claim 1 wherein a pigment is also present.

References Cited by the Examiner
UNITED STATES PATENTS

| | | | |
|---|---|---|---|
| 2,819,247 | 1/58 | Lundberg | 260—45.95 |
| 2,860,115 | 11/58 | Hecker et al. | 260—45.7 |
| 2,976,259 | 3/61 | Hardy et al. | 260—45.95 |
| 2,999,843 | 9/61 | Porck | 260—45.95 |
| 3,043,797 | 7/62 | Addleburg et al. | 260—45.85 |
| 3,069,369 | 12/62 | Galbraith et al. | 260—45.95 |

JOSEPH L. SCHOFER, *Primary Examiner.*

J. R. LIBERMAN, *Examiner.*